US006943515B2

(12) United States Patent
Kidokoro

(10) Patent No.: US 6,943,515 B2
(45) Date of Patent: Sep. 13, 2005

(54) CONTROLLER OF AUTOMOTIVE POWER DOOR

(75) Inventor: Hitoshi Kidokoro, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 9 days.

(21) Appl. No.: 10/318,128

(22) Filed: Dec. 13, 2002

(65) Prior Publication Data

US 2003/0115803 A1 Jun. 26, 2003

(30) Foreign Application Priority Data

Dec. 21, 2001 (JP) ...................................... 2001-389833

(51) Int. Cl.[7] ........................... G05B 5/00; G05D 3/00; H02H 7/08; H02P 1/04; H02P 3/00

(52) U.S. Cl. ....................... 318/466; 318/470; 318/266; 318/282; 318/286; 49/26; 49/28; 49/118

(58) Field of Search ................................ 318/466–470, 318/265–268, 280–286; 49/26, 43, 293, 118, 138–139, 280, 334, 360, 293.1; 160/296

(56) References Cited

U.S. PATENT DOCUMENTS

| | | | | | |
|---|---|---|---|---|---|
| 4,713,591 | A | * | 12/1987 | McCloskey | 318/257 |
| 5,708,338 | A | * | 1/1998 | Cook et al. | 318/466 |
| 5,831,403 | A | * | 11/1998 | Kanki et al. | 318/286 |
| 5,929,580 | A | * | 7/1999 | Mullet et al. | 318/466 |
| 5,963,000 | A | * | 10/1999 | Tsutsumi et al. | 318/480 |
| 6,164,015 | A | * | 12/2000 | Kawanobe et al. | 49/360 |
| 6,208,102 | B1 | * | 3/2001 | Kikuchi et al. | 318/466 |
| 6,326,751 | B1 | * | 12/2001 | Mullet et al. | 318/434 |

* cited by examiner

*Primary Examiner*—Marlon T. Fletcher
*Assistant Examiner*—Renata McCloud
(74) *Attorney, Agent, or Firm*—McDermott Will & Emery LLP

(57) ABSTRACT

An electric drive motor drives a door to move in an open/close direction. A pulse encoder outputs a series of pulses. Each pulse has a pulse duration sized to correspond to a rotation speed of the motor. The number of the pulses corresponds to the number of revolution of the motor. A door jamming detecting device for detecting a jamming of the door is configured to carry out calculating a total duration time (Tn) of a given number (n) of the series pulses outputted from the pulse encoder; detecting a given condition wherein the total duration time (Tn) is greater than a threshold value (Ts); and making a judgment of the door jamming when the given condition is kept for a given time (Tm).

7 Claims, 3 Drawing Sheets

CONTROLLER OF AUTOMOTIVE POWER DOOR

BACKGROUND OF INVENTION

1. Field of Invention

The present invention relates in general to auto-slide doors of wheeled motor vehicles, and more particularly, to controllers of such auto-slide doors. More specifically, the present invention is concerned with the controllers of a type that can precisely detect undesired condition wherein a foreign thing or things are caught in the door.

2. Description of Prior Art

Hitherto, various types of auto-slide doors have been proposed and put into practical use, particularly in the field of wheeled motor vehicles. Some of the auto-slide doors are of a type that comprises generally a slide door that is slidably mounted to a vehicle body, a wire cable that is connected to the slide door proper, and an electric drive motor that drives the wire cable in one and other directions upon energization. That is, when the drive motor is energized to run in one direction, the wire cable pulls the slide door in a direction to open a door opening of the vehicle body, while, when the drive motor is energized to run in the other direction, the wire cable pulls the slide door in the other direction to close the door opening. For sensing the position of the slide door, a pulse encoder is employed. That is, by counting the number of pulses outputted from the pulse encoder, the full-open or full-closed position of the slide door is detected.

However, it often happens that under movement thereof, a foreign thing is caught in the slide door to obstruct a smoothed operation of the door. For solving such undesired matter, a detector system is employed, which functions to move back the door in the opposite direction upon sensing such door jamming. That is, upon sensing such door jamming under movement of the door in an open direction, the detector system moves the door in a close direction, while, upon sensing such jamming under movement in the close direction, the system moves the door in the open direction. With this function, abnormal stress inevitably applied to the drive motor upon door jamming can be relieved.

However, some of the auto-slide doors of the above-mentioned type have failed to exhibit a satisfied function or movement of the slide door due to their inherent construction.

SUMMARY OF INVENTION

It is therefore an object of the present invention to provide a controller of an electric slide door, which is superior to controllers of the above-mentioned known auto-slide doors.

According to a first aspect of the present invention, there is provided a controller of an automotive power door, which comprises an electric drive motor that drives the door to move in an open/close direction; a pulse encoder that outputs a series of pulses, each pulse having a pulse duration sized to correspond to a rotation speed of the motor, the number of the pulses corresponding to the number of revolution of the motor; and a door jamming detecting section that detects a jamming of the door, the door jamming detecting section being configured to carry out calculating a total duration time of a given number of the series pulses outputted from the pulse encoder; detecting a given condition wherein the total duration time is greater than a threshold value; and making a judgment of the door jamming when the given condition is kept for a given time.

According to a second aspect of the present invention, there is provided a controller of an automotive power door, which comprises an electric drive motor that drives the door to move in an open/close direction; a pulse encoder that outputs a series of pulses, each pulse having a pulse duration sized to correspond to a rotation speed of the motor, the number of the pulses corresponding to the number of revolution of the motor; and a door jamming detecting section that detects a jamming of the door, the door jamming detecting section including a first section that calculates a total duration time of a given number of the series of pulses outputted from the pulse encoder; a second section that senses a given condition wherein the total duration time is greater than a threshold value; a third section that makes a judgment of the door jamming when the given condition is kept for a given time.

DETAILED DESCRIPTION OF INVENTION

Figure 1:
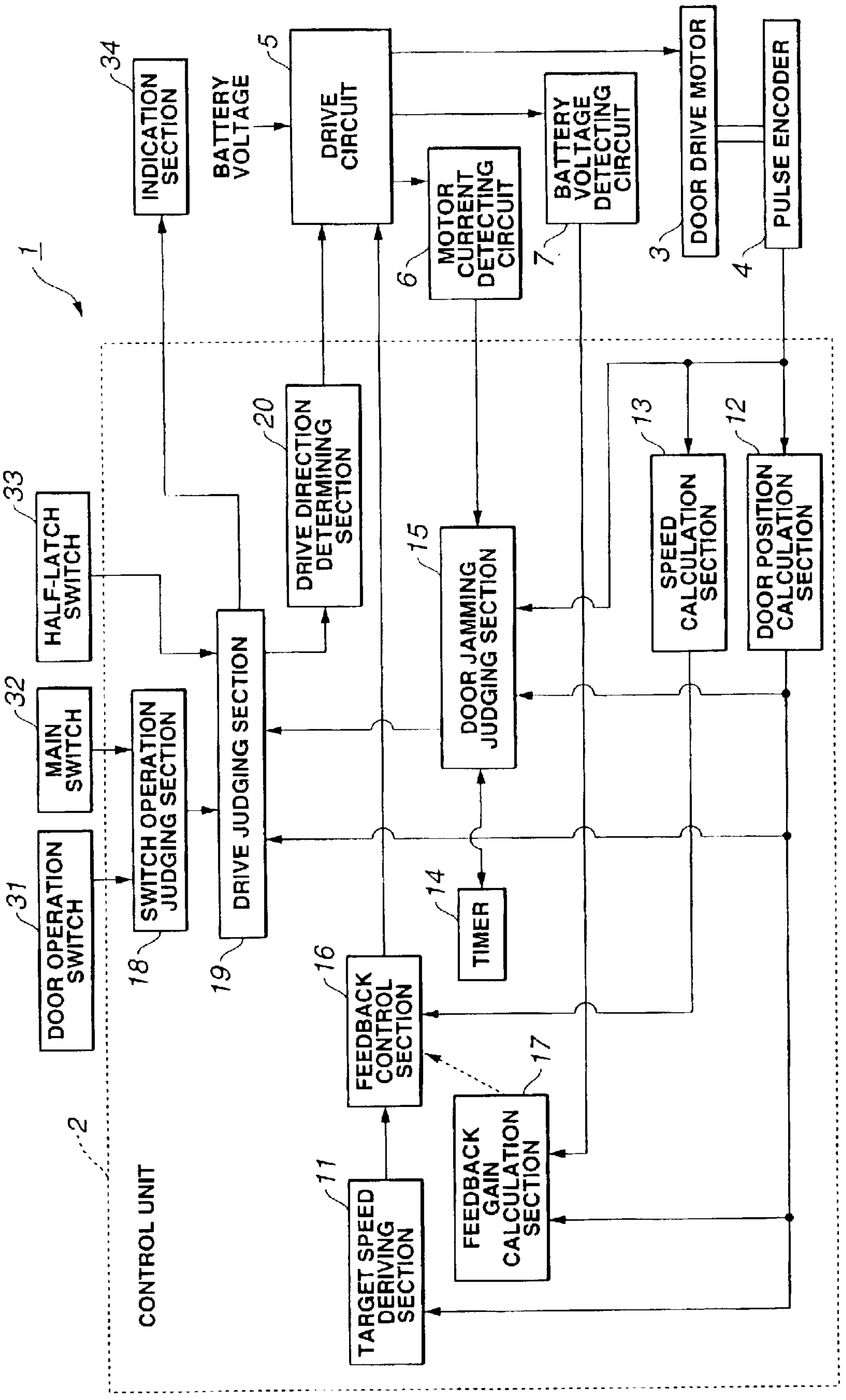
FIG. 1 is a block diagram of a controller of an electric slide door, according to the present invention.

Referring to the accompanying drawings, particularly FIG. 1, there is shown a block diagram of a controller 1 of an electric slide door, which embodies the present invention.

As shown in the drawing, the controller 1 of the invention comprises a control unit 2 that controls a door drive motor 3 installed in a vehicle body.

Although not shown in the drawings, a wire cable has opposed ends connected to a slide door, and a part of the wire cable is put around a pulley that is connected to an output shaft of the drive motor through a speed reduction gear. Thus, when the motor is energized to run in one direction, the slide door is slid in one direction, for example, in a direction (viz., open direction) to open a door opening formed in the vehicle body, while, when the motor is energized to run in the other direction, the slide door is slid in the other direction, viz., in a direction (viz., close direction) to close the door opening.

The controller 1 of the present invention further comprises a pulse encoder 4 that produces a series of pulses (see FIG. 4) in which each pulse has a pulse duration sized to correspond to the rotation speed of motor 3 and the number of pulses corresponds to the number of revolution of motor 3. The controller 5 further comprises a drive circuit 5 that drives door drive motor 3, a motor current detecting circuit 6 that detects the current flowing in door drive motor 3 and a battery voltage detecting circuit 7 that detects the voltage of a battery (not shown).

The control unit 2 comprises a target speed deriving section 11 that derives a target speed of door drive motor 3, a door position calculating section 12 that calculates the existing position of slide door based on the pulse signal issued from pulse encoder 4 and a speed calculation section 13 that calculates the moving speed of the slide door based on the pulse signal.

The control unit 2 further comprises a door jamming judging section 15 that judges a door jamming based on the detected existing position of the slide door, the pulse duration of the pulse signal issued from the pulse encoder 4 and the detected current value from motor current detecting circuit 6. The information signal from door jamming judging section 15 is led to a drive judging section 19. The control unit 2 further comprises a timer 14 that measures a time needed for judging the door jamming carried out in door jamming judging section 15 and a feed back control section 16 that carries out a feed back control of drive circuit 5 based on the output signal from speed calculation section 13 and those from target speed deriving section 11, and a feedback gain calculation section 17 that derives a feedback gain based on the battery voltage and the existing position pulses from door position calculation section 12.

Based on the information signals from door position calculating section 12, a half-latch switch 33 and door jamming judging section 15, drive judging section 19 determines drive/stop operation and rotation direction of door drive motor 3.

The control unit 2 further comprises a switch operation judging section 18 that detects operation of a door operation switch 31 and a main switch 32 and feeds drive judging section 19 with output signal thereof. The control unit 2 further comprises a drive direction determining section 20 that receives output signal from drive judging section 19 and feeds drive circuit 5 with output signal thereof.

Upon receiving an information signal from door jamming judging section 15 that represents a door jamming, drive judging section 19 issues an instruction signal to drive direction determining section 20 to change the rotation direction of door drive motor 3.

Denoted by numeral 34 is an indication section that receives output signal from drive judging section 19 to issue an acoustic and/or visual alarm when the slide door is under operation.

In the following, programmed operation of controller 1 of electric slide door of the invention will be described with reference to the flowcharts of FIGS. 3 and 4.

Figure 2:
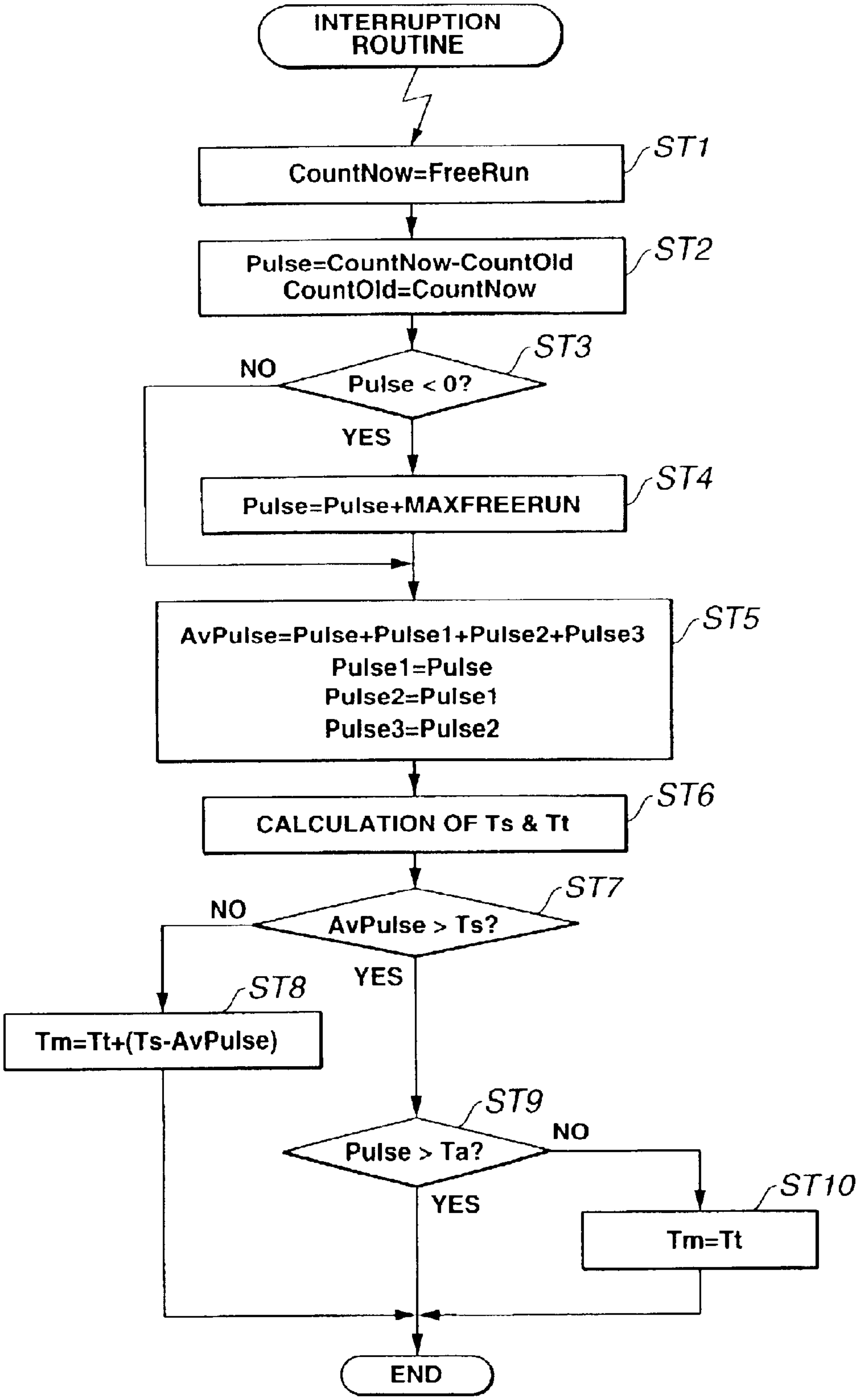
FIG. 2 is a flow chart showing operation steps of a main routine, which are carried out in a control unit employed in the controller of the present invention.

In FIG. 2, at the timing when an edge of a pulse of the series of pulses from pulse encoder 3 arises, an interruption routine starts to operate. That is, at step ST1, a current counted value "CountNow" possessed by door jamming judging section 15 is set as an initial value "FreeRun". Then, at step ST2, the pulse duration "Pulse" outputted from pulse encoder 4 is derived by subtracting a previous counted value "CountOld" from the current counted value "CountNow", and the current counted value "CountNow" is set as the counted value "CountOld".

Then, at step ST3, judgment is carried out as to whether the derived pulse duration "Pulse" is negative or not. If YES, that is, when the pulse duration "Pulse" is smaller than 0 (zero), the operation flow goes to step ST4 where a countermeasure for overflow is taken. That is, a predetermined value "MAXFREERUN" is added to the pulse duration "Pulse" to provide a renewed pulse duration. Then, the renewed pulse duration "Pulse", one-step before (or previous) pulse duration "Pulse 1", two-step before pulse duration "Pulse 2" and three-step before pulse duration "Pulse 3" are added to prepare an average pulse duration "AvPulse". That is, the following equation (1) is executed.

$$AvPulse = Pulse + Pulse\ 1 + Pulse\ 2 + Pulse\ 3 \quad (1)$$

Then, the renewed pulse duration "Pulse", one-step before pulse duration "Pulse 1" and two-step before pulse duration "Pulse 2" are written as one-step before pulse duration "Pulse 1", two-step before pulse duration "Pulse 2" and three-step before pulse duration "Pulse 3" respectively.

As shown in the flowchart of FIG. 2, if, at step ST3, NO answer is made, that is, when the pulse duration "Pulse" is greater than or equal to 0 (zero), the operation flow goes step ST5 bypassing step ST4.

From step ST4, the operation flow goes to step ST6. At this step ST6, based on the existing position of the slide door calculated by door position calculating section 12, a threshold value "Ts" corresponding to the door position and a predetermined value "Tt" of duration time (viz., predetermined time) are calculated.

Then, the operation flow goes to step ST7. At this step, judgment is carried out as to whether the average pulse duration "AvPulse" is greater than the threshold value "Ts" or not. If NO, that is, when the average duration "AvPulse" is smaller than or equal to the threshold value "Ts", the operation flow goes to step ST8. At this step, a timer count value "Tm" is determined by using the following equation (2), $$Tm = Tt + (Ts - AvPulse) \quad (2)$$

Figure 4:
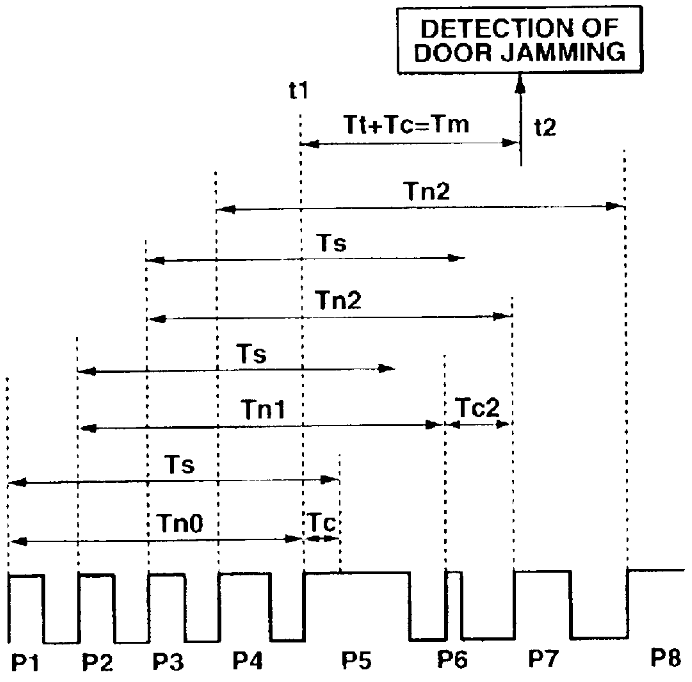
FIG. 4 is a timing chart showing pulse signals produced by a pulse encoder.

That is, the value "Tt+Tc" shown in FIG. 4 is set as a renewed timer count value "Tm".

If, at step ST7, YES answer is issued, that is, when the average pulse duration "AvPulse" is greater than the threshold value "Ts", the operation flow goes to step ST9. At this step ST9, judgment is carried our as to whether the renewed pulse duration "Pulse" is greater than a predetermined value "Ta" (viz., ⅛ of the average pulse duration "AvPulse") or not. If NO, that is, when the renewed pulse duration "Pulse" is smaller than or equal to the predetermined value "Ta", the operation flow goes to step ST10 where the renewed timer count value "Tm" is set to the predetermined value "Tt", and timer 14 is reset. While, if YES at step ST9, that is, when the renewed pulse duration "Pulse" is greater than the predetermined value "Ta", the operation flow goes to END directly. Thus, in this case, reset of timer 14 is not carried out.

Figure 3:
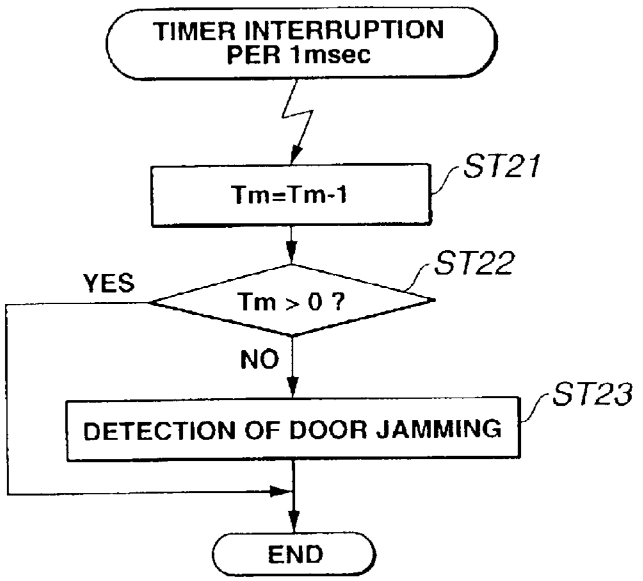
FIG. 3 is a flowchart showing operation steps of an interruption routine, which are carried out in the control unit.

As is seen from the flowchart of FIG. 3, when a count-up is made by timer 14 through steps ST21 and ST22 (NO), door jamming judging section 15 outputs a so-called door jamming detection signal to drive judging section 19 at step ST23.

FIG. 4 shows a timing chart showing pulse signals produced by pulse encoder 4.

In the following, detection/non-detection of door jamming will be described with reference to the timing chart of FIG. 4.

For ease of understanding, let us assume that pulses P1, P2, P3, P4, P5, P6, P7 and P8 are produced in time series, as shown. As is seen from the time chart, the total duration time "Tn0" of the pulses P1, P2, P3 and P4 is shown shorter than the threshold value "Ts". In such case, timer 14 is reset and thus the time count up is not made. That is, if a pulse duration of the size corresponding to that of the four pulses P1, P2, P3 and P4 is detected prior to the time when the time reaches the threshold value "Ts", timer 14 becomes reset at that time "T1", and thus, it can not continue its count-up operation. That is, in such case, the value "Tt" can not be measured and thus the door jamming detecting signal is not produced.

In such case, a difference "Tc" between the total duration time "Tn0" of the four pulses P1, P2, P3 and P4 and the threshold value "Ts" is calculated, and a count-up time for a subsequent time-up counting of timer 14 is set to a value "Tt+Tc".

If, then, a wider pulse like pulse P5 is received, the total duration time "Tn1" of the four pulses P2, P3, P4 and P5 becomes greater than the threshold value "Ts". Thus, in this case, timer 14 is not reset. That is, timer 14 that has been reset at the time "t1" continues the time-up counting.

When, then, a pulse P6 is received, timer 14 continues the time-up counting without resetting because the total duration time "Tn2" of the four pulses P3, P4, P5 and P6 is also greater than the threshold value "Ts". That is, in this case, when timer 14 counts up the value "Tt+Tc", that is, at the time "t2", the door jamming detection signal is issued.

That is, as long as normal sized pulses, like pulses P1, P2, P3 and P4, are continuously outputted, timer 14 makes its resetting at a given time (t1). Thus, in such case, the door jamming detection signal is not issued. However, when a wider pulse like pulse P5 is received causing the total duration time of subsequent four pulses including the wider pulse to be greater than the threshold value "Ts", timer 14 is forced to issue the door jamming detecting signal when counting up the value "Tt+Tc".

As is described hereinabove, in the controller of the present invention, the following steps are practically employed.

That is, first, total duration time "Tn" of a given number of pulses is derived. Then, comparison of time "Tn" with a threshold value "Ts" is carried out. If total duration time "Tn" is smaller than threshold value "Ts", timer 14 is reset, while if greater than "Ts", timer 14 is not reset.

When the slide door is encountered a jamming, it inevitably occurs that a wider pulse is produced. Thus, in this case, the timer 14 is not reset at the given time, and thus, upon expiration of the counting-up, the door jamming detecting signal is issued. In this case, the counting-up time or predetermined value "Tt" is suitably varied in accordance with the size of the total duration time "Tn".

That is, the counting-up time "Tt" needed for issuing the door jamming detecting signal is not fixed, but varied with addition of the difference time "Tc". Accordingly, when the moving speed of the slide door is high, the total duration time of four pulses becomes small, and thus, the difference between the time and threshold value becomes large. Thus, in this case, the counting-up time needed for issuing the door jamming detecting signal is increased.

Thus, even when, with a vehicle being parked facing down hill, the slide door under closing movement comes into contact with a weather strip prior to a set time when the door should contact the weather strip (viz., a set time when the number of pulses should be counted when the slide door contacts the weather strip), the controller of the present invention is prevented from issuing the door jamming detecting signal erroneously and thus prevented from forcing the slide door to move back in an opposite direction erroneously.

Furthermore, even when, like the time "Tn1", the total duration time of four pulses becomes greater than the threshold value "Ts", timer 14 may be reset in case when the pulse duration "Tc2" of a subsequent pulse signal is smaller than a predetermined value "Ta" (for example, ½ of averaged pulse duration). In this case, even when the pulse duration is forced to change because of back-rush phenomenon of gears, poor operation of pulse encoder 4, etc., issuing of erroneous door jamming detecting signal is assuredly prevented.

In the present invention, following modifications are possible.

In the above-mentioned embodiment, a total duration time of four pulses is used for detecting change of pulse duration. However, if desired, five or more pulses and three or less pulses may be used for deriving the total duration time.

In the above-mentioned embodiment, when the total duration time "Tn" becomes smaller than the threshold value "Ts", the difference "Tc" therebetween is added to the time "Tn" to provide a count-up time. However, if desired, for deriving the count-up time, a time value that is varied in accordance with the different "Tc" may be used.

In the above-mentioned embodiment, at step ST9 of the flowchart of FIG. 2, ⅛ of the average pulse duration "AvPulse" is used as the predetermined value "Ta". However, in the present invention, other value than ⅛ is also usable.

In the above-mentioned embodiment, a slide door is described as a door to which the present invention is practically applied. However, other type doors can be also used for the invention.

The entire contents of Japanese Patent Applications 2001-389833 filed Dec. 21, 2001 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A controller of an automotive power door which is powered by an electric drive motor to move in opening and closing directions, the controller comprising:

a pulse encoder that outputs series of pulses, each pulse having a pulse duration sized to correspond to a rotation speed of the motor, the number of the pulses corresponding to the number of revolution of the motor; and a door jamming detecting section that detects a jamming of the door, the door jamming detecting section being configured to carry out:

calculating a total duration time of a given number of the series pulses outputted from the pulse encoder;

detecting a given condition wherein the total duration time is greater than a threshold value; and making a judgment of the door jamming when the given condition is kept for a given time, wherein the given time is determined based on the total duration time and the given time is derived by adding, to a predetermined value, a difference between the total duration time and the threshold value.

2. The controller of an automotive power door as claimed in claim 1, in which the door jamming detecting section is configured to carry out:

calculating the total duration time each time a new pulse is outputted from the pulse encoder;

issuing a first instruction signal when the total duration time is smaller than or equal to the threshold value;

issuing a second instruction signal when the total duration time is greater than the threshold value;

upon issuance of the first instruction, resetting a timer for restarting a time counting operation of the same and setting the given time; and, upon issuance of the second instruction, keeping the timer to continue the time counting operation for a time longer than the time when the timer is to be reset.

3. The controller of an automotive power door as claimed in claim 2, in which the door jamming detecting section is configured to carry out:

resetting the timer for restarting the time counting operation of the same when, upon issuance of the second instruction, the pulse duration of a subsequent pulse is smaller than a predetermined value.

4. The controller of an automotive power door as claimed in claim 3, in which the predetermined value is determined based on the total duration time.

5. The controller of an automotive power door as claimed in claim 3, further comprises a door position detecting section that detects a position of the door during opening and closing of the door based on the number of pulses, and in which at least one of the threshold value and the predetermined value is determined based on the position detected by the door position detecting section during opening and closing of the door.

6. The controller of an automotive power door as claimed in claim 1, further comprising a drive direction control section that controls a direction in which the door moves, the drive direction control section moving back the door in an opposite direction when the door jamming detecting section detects a jamming of the door.

7. A controller of an automotive power door which is powered by an electric drive motor to move in opening and closing directions, the controller comprising:

an electric drive motor that rives the door to move in an open/close direction;

a pulse encoder that outputs series of pulses, each pulse having a pulse duration sized to correspond to a rotation speed of the motor, the number of the pulses corresponding to the number of revolution of the motor; and a door jamming detecting section that detects a jamming of the door, the door jamming detecting section including:

a first section that calculates a total duration time of a given number of the series of pulses outputted from the pulse encoder;

a second section that senses a given condition wherein the total duration time is greater than a threshold value;

a third section that makes a judgment of the door jamming when the given condition is kept for a given time, wherein the given time is determined based on the total duration time and the given time is derived by adding, to a predetermined value, a difference between the total duration time and the threshold value.

* * * * *